United States Patent [19]

Dye et al.

[11] 4,092,092

[45] May 30, 1978

[54] APPARATUS FOR MAKING CERAMIC ARTICLES

[75] Inventors: Homer S. Dye; Lloyd V. Hamner, both of Hacienda Heights, Calif.

[73] Assignee: Pacific Clay Products, Santa Fe Springs, Calif.

[21] Appl. No.: 705,803

[22] Filed: Jul. 16, 1976

[51] Int. Cl.[2] ............................................ B29D 23/04

[52] U.S. Cl. ........................................ 425/291; 83/9; 264/150; 264/156; 425/308; 425/377

[58] Field of Search .................. 83/7, 9, 11; 425/290, 425/291, 296, 301, 306, 308, 315, 316, 377; 264/141, 148, 150, 154, 156, 159, 155

[56] References Cited

U.S. PATENT DOCUMENTS

| | | | |
|---|---|---|---|
| 2,334,577 | 11/1943 | Postlewaite | 83/11 X |
| 3,183,571 | 5/1965 | Schmunk et al. | 425/291 |
| 3,255,949 | 6/1966 | Buttery | 83/9 X |
| 3,349,657 | 10/1967 | Goetz | 83/11 X |
| 3,664,787 | 5/1972 | Fairbanks | 425/380 X |

*Primary Examiner*—Francis S. Husar
*Assistant Examiner*—Mark Rosenbaum
*Attorney, Agent, or Firm*—Lyon & Lyon

[57] ABSTRACT

A method and apparatus for making ceramic articles, particularly adapted for making roofing tile of S-shaped cross section, wherein a clay extrusion of essentially hollow triangular shape form three sets of tile having severable connections along the apices of the triangular extrusion, each set being S-shaped and supported, as extruded, by a core of corresponding shape; the axial movement of the extrusion being stopped intermittently while serrated blades conforming to the core are pressed radially against the core to score the extrusion and form severable connections dividing each set of tile; the extrusion being severed at selected transverse planes to produce a multiple tile unit for kiln heatment, the tile unit including integral but severable end portions forming kiln furniture for supporting the multiple tile units.

6 Claims, 5 Drawing Figures

FIG. 6.
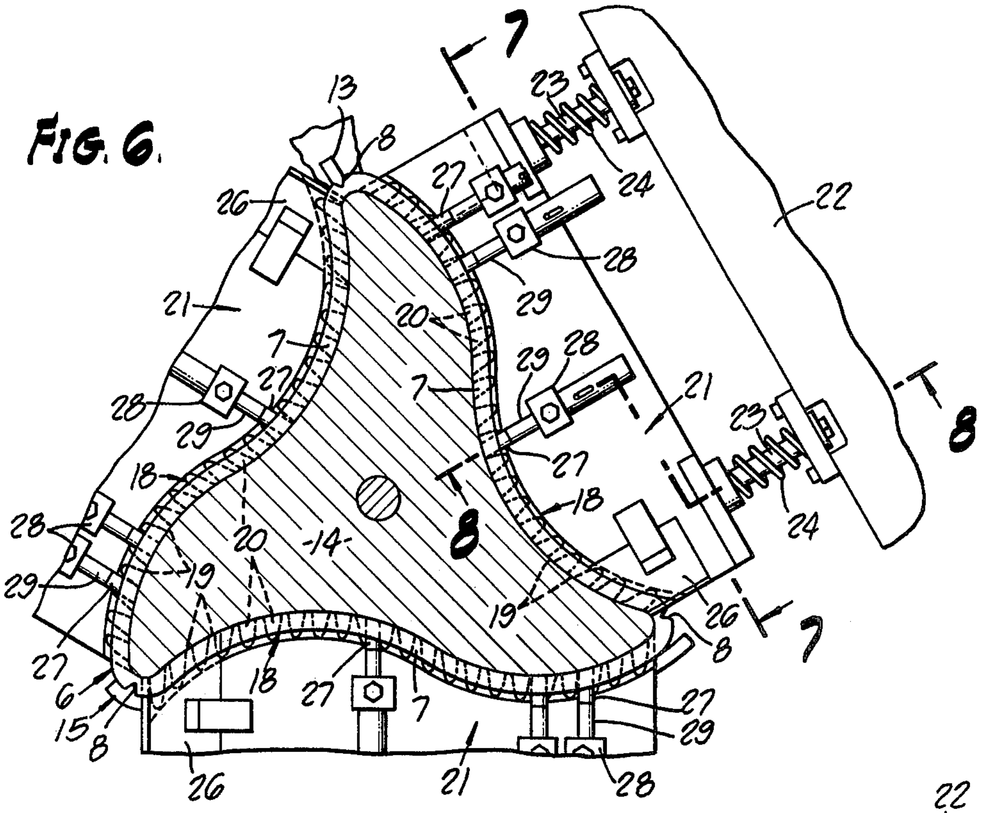
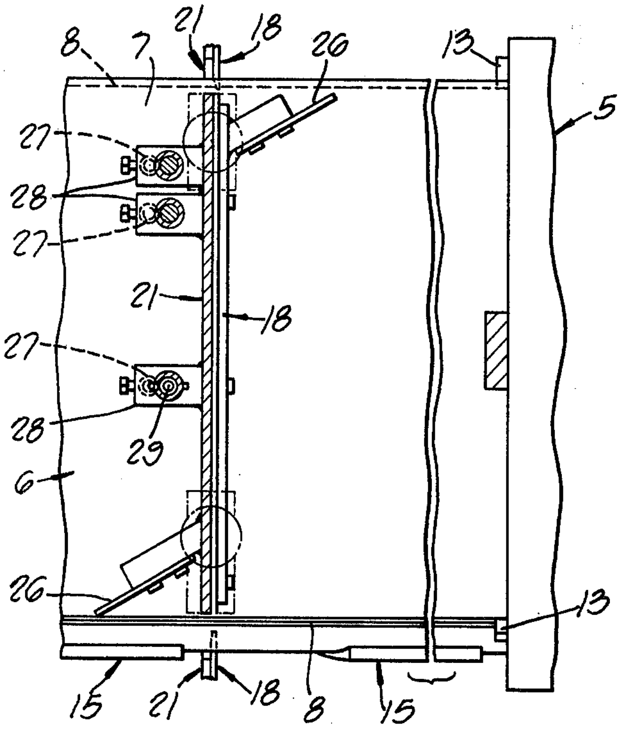
FIG. 7.
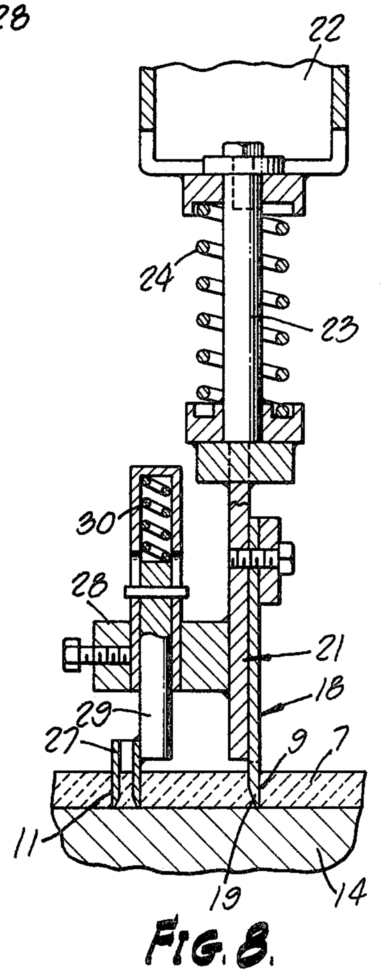
FIG. 8.

APPARATUS FOR MAKING CERAMIC ARTICLES

SUMMARY

This invention is directed to apparatus for manufacturing ceramic articles and is particularly adapted to the manufacture of ceramic tile shingles which have relatively great length and width compared to their thickness. Such articles, when placed on end in spaced relation as required in a kiln, particularly when placed on a carrier for transport into a kiln, are unstable. This problem is compounded by the fact that such articles when in their initial or soft clay state have minimum strength.

An important object of this invention is to provide apparatus which is particularly suited for the manufacture of articles, such as tile shingles, wherein a polygonal tubular extrusion is scored, as extruded, longitudinally to define junctures between sets of the articles, and is intermittently scored peripherally to define junctures between individual articles; the tubular extrusion being severed at intervals between the peripheral junctures to form tubular structures defining a multiplicity of articles as well as end collars which serve as kiln furniture to support a plurality of the tubular structures in closely spaced vertical position in a kiln; the junctures being so scored that upon being kiln fired; and glazed if desired, the junctures may be severed to produce the individual articles.

A further important object of this invention is to provide apparatus which is particularly adapted to produce ceramic tile shingles which are S-shaped in transverse aspect.

The method of this invention includes the steps of extruding, a tubular member of soft clay onto a core defining the cross section of the tubular member; scoring the tubular member longitudinally, intermittently interrupting movement of the tubular member; scoring the tubular member simultaneously, while stationary on the core, in a peripheral direction and in a plurality of planes between the longitudinal scores; and severing the tubular member between the scored planes of successive units of the tubular member to form integral tubular kiln furniture, at least one end of each tubular member unit; positioning the tubular member units vertically in a kiln until vitrified; and finally severing each tubular member unit along the longitudinal and peripheral scores to form a plurality of articles.

The apparatus of this invention utilizes external and internal extrusion dies, and includes peripherally spaced external scoring dies; a core, having the same profile as the internal die extending horizontally therefrom and overlying a platen for supporting the lower side of the extrusion; sets of axially spaced coplanar peripherally extending external scoring dies, and a severing tool for cutting the extrusion, the severing tool being so located that at least one end portion of the severed extrusion forms kiln furniture for supporting the severed extrusion in vertical position.

BRIEF DESCRIPTION OF THE FIGURES

FIG. 6 is a further enlarged sectional view taken through 6—6 of FIG. 1 with the scoring dies in elevation and in scoring position certain of the scoring dies being shown fragmentarily.

FIG. 7 is a fragmentary sectional view taken through 7—7 of the FIG. 6.

FIG. 8 is another fragmentary sectional view taken through 8—8 of the FIG. 6.

DETAILED DESCRIPTION

Figures 1, 2, 3, 4:
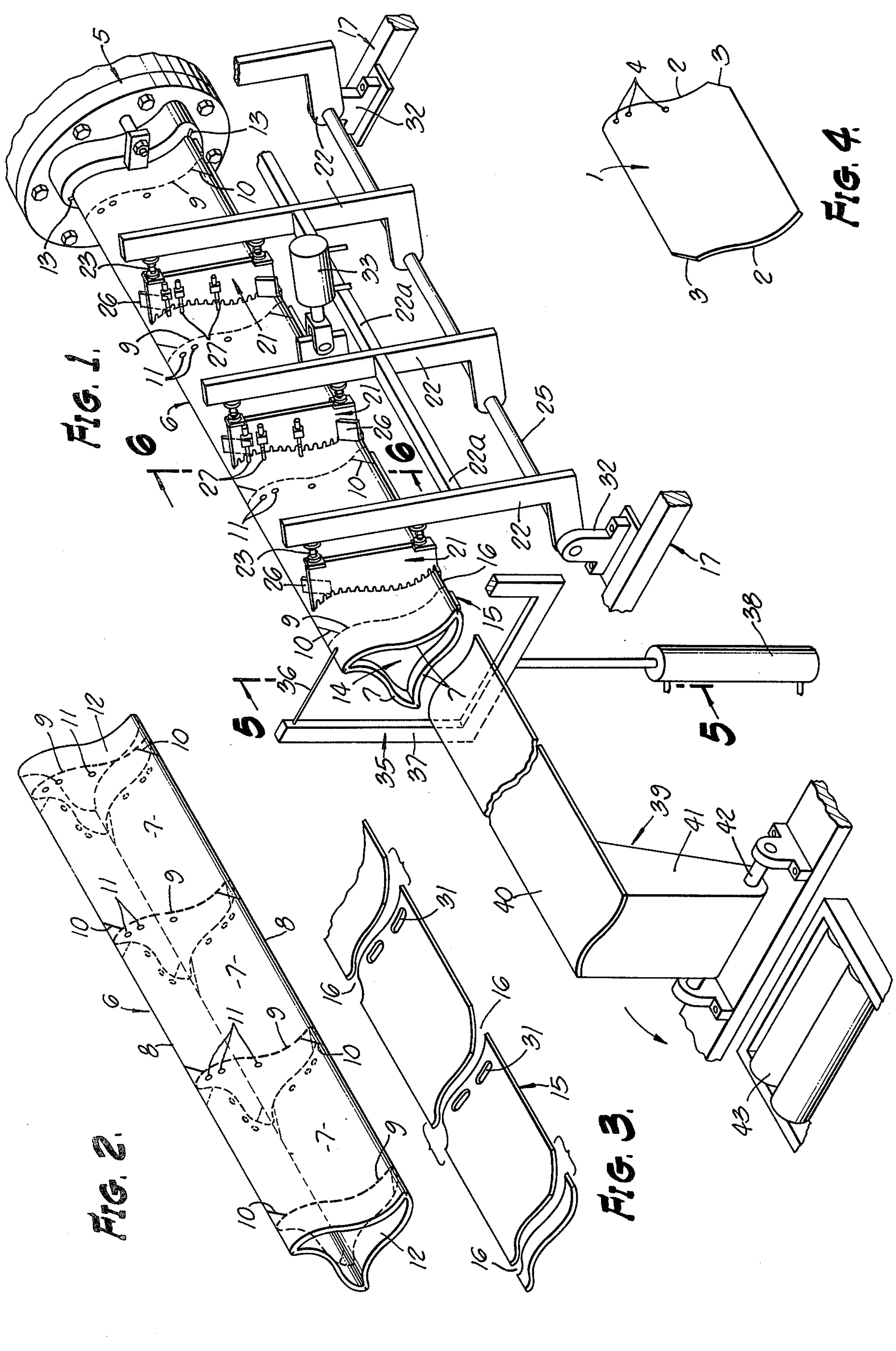
FIG. 1 is a fragmentary perspective view of the apparatus for making ceramic articles.
FIG. 2 is a perspective view of a tubular extrusion as it appears when scored and ready for kiln treatment.
FIG. 3 is a perspective view of the extrusion supporting platen.
FIG. 4 is a perspective view of the finished product.
Figure 5:
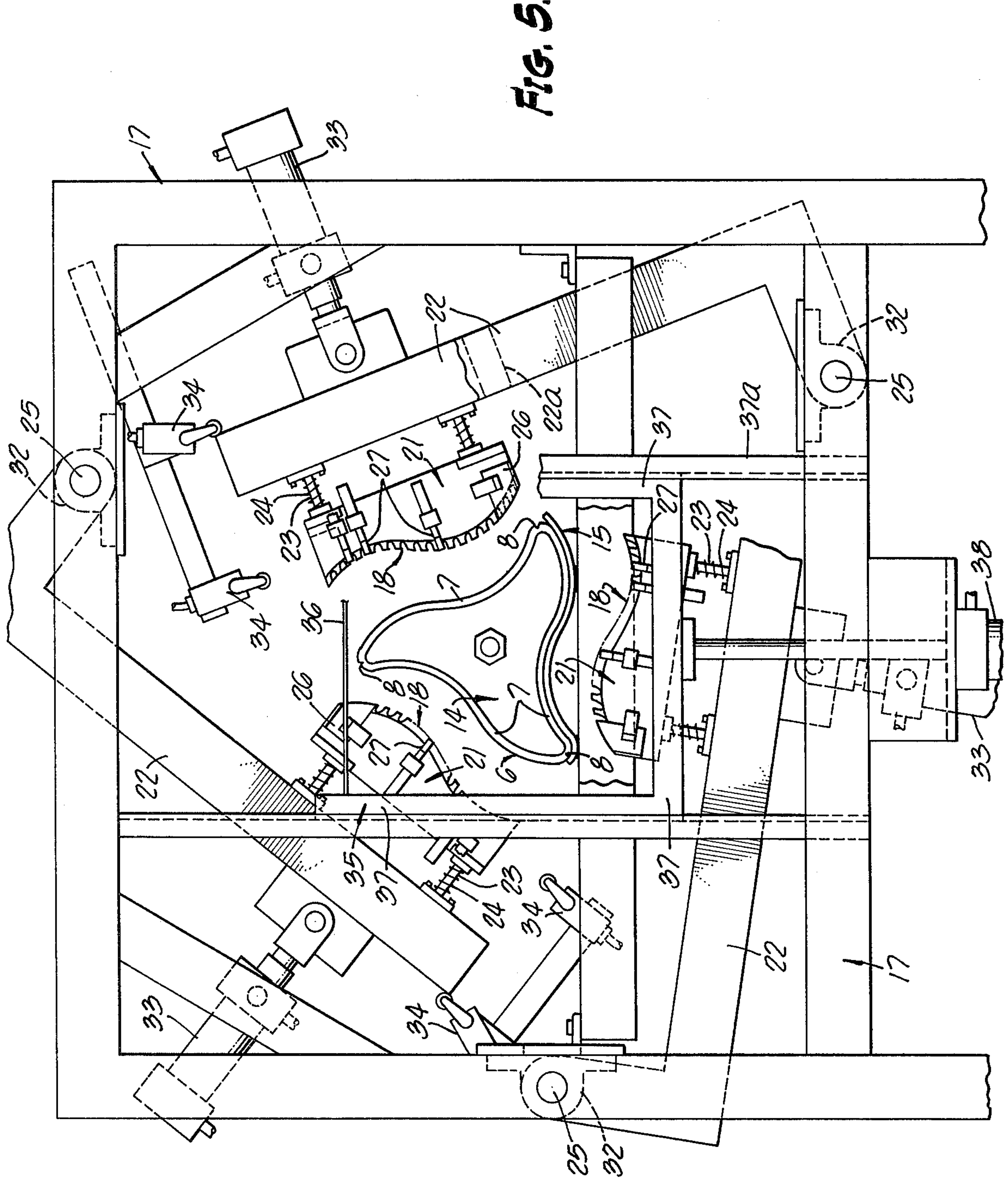
FIG. 5 is an enlarged end view taken approximately in the plane 5—5 of FIG. 1, showing the scoring die blades as spaced from the extrusion.

The method and apparatus for making ceramic articles may be adapted to make articles of various shapes providing that the articles may be initially joined and form fragments of a tubular extrusion. For purposes of illustration, but not limitation, the method and apparatus herein shown and described is directed to the forming of roofing tiles or shingles 1 as indicated in FIG. 4. More particularly the tile or shingle is S-shaped transversely as indicated by 2, is beveled at two diagonal corners as indicated by 3 and is provided with perforations 4 along one margin.

The tiles or shingles 1 are produced by an extrusion die 5, which is so contoured as to produce an extrusion 6 having S-shaped sides 7 longitudinally extending scored apices 8, transversely scored planes 9, scored diagonally disposed corners 10, perforations 11, and a kiln furniture collar 12 at each end as shown in FIG. 2.

The extrusion die includes scoring die elements 13 positioned as indicated in FIG. 1 to produce the longitudinal scored apices 8. The extrusion die 5 includes a core die, not shown, to which is attached a core extension 14 of the same profile as the extrusion die core. Underlying the core extension 14 is a supporting platen 15 divided transverely by cross slots 16. The contour and spacing of the platen is such as to permit the soft clay extrusion to be forced along the core extension without the underside sagging away from the core extension.

Supported by a mounting frame structure 17 surrounding the core extension 14 is a plurality of scoring die blades 18. Each scoring die blade has an S-shaped profile corresponding to the S-shaped profile of the core extension 14. Each blade includes a plurality of projections 19 spaced by grooves 20.

Each scoring die blade is secured to a supporting blade 21 which, in turn, is attached to a pivot arm 22 by means of a pair of guide pins 23 surrounded by springs at 24 which urge the supporting plates 21 to an extended position relative to the pivot arms 22. The pivot arms 22, which carry the supporting plates 21 and scoring die blades 18 engagable with a corresponding side 7 of the extrusion 6 are connected by cross bars **22*a* and are mounted on a common pivot shaft 25. The shafts are so positioned that the scoring die blades 18 move in an approximately radial direction with respect to the core extension 14**.

The profiles of the scoring die blades 18 conform to the profile of the corresponding sides of the core extension 14. The springs 24 are sufficiently strong as to force the blades through the walls of the extrusion 6, and to yield when the core extension 14 is engaged. In the construction illustrated, the extrusion 6 is provided with three S-shaped sides 7 and three scoring die blades 18 define a common plane; also four sets of scoring die blades 18 are provided. The cross slots 16 clear the underlying scoring die blades 18.

As indicated previously, it is desirable to bevel a pair of the diagonally disposed corners 3 of the shingles 1 by scoring the corners 10 of the extrusion 6. This is accomplished by corner cutting blades 26 carried by the supporting blades 21. Also in order to provide the perforations 11 in the extrusion, which become perforations 4 in the product, hole punching dies 27 are carried by the supporting plates 21 by means of brackets 28 provided with guide pins 29 and springs 30 so that the punching dies 27 may yield upon contacting the core extension 14. Appropriate clearing perforations 31 are provided in the platen 15.

The pivot shaft 25 for the scoring die blades 18 engaging a common side of the extrusion is provided with end bearings 32 attached to the mounting frame structure 17. The scoring die blades connected to a common shaft 25 are moved by hydraulic or pneumatic drive units 33 in unison to and from the core extension 14 and, when in contact with the core extension, surround extrusion 6. Appropriate control switches 34 are provided for determining the range of movement of the scoring die blades 18.

Located a short distance beyond the set of scoring die blades 18 most remote from the extrusion die 5 is an extrusion cutter 35 which includes a cutter wire 36 and a supporting frame 37 slidable in a guide frame **37*a*. The cutter wire is moved by a drive unit 38 in a transverse plane across the extrusion at a location immediately beyond the core extension 14**.

Positioned beyond the core extension 14 and platen 15 is an extrusion tilting unit 39 which includes an extrusion receiving plate 40 forming an extension of the platen 15. The plate 40 is connected to a pivot arm 41 which in turn is joined to a pivot shaft 42. Immediately beyond the extrusion receiving plate 40 is a conveyor 43. The tilting unit 39 tilts the severed extrusion from a horizontal position to a vertical position on the conveyor 43.

The method of forming ceramic articles is as follows:

An extrusion die of appropriate contour is operated intermittently to force a selected length of a soft extrusion, such as one formed of clay, onto the core extension 14 while being supported in part by the platen 15 underlying the core extension 14. The extrusion cycle is stopped when the extrusion has protruded beyond the core extension 14 a short distance. During this movement, the scoring die elements 13 form the longitudinal scored apices 8 along the extrusion. The scoring die blades 18 are then operated simultaneously to engage and score the extrusion 6 at a plurality of planes; whereupon, the blades 18 are retracted from the extrusion. Simultaneously, the extrusion cutter 35 is operated, whereupon, the extrusion cycle is repeated. The severed extrusion unit forms between the longitudinal scores 8 and peripheral scores 9 a plurality of products such as the roofing tile or shingles 1. Also formed is a kiln furniture collar 12, preferably one at each end of the extrusion unit. When the severed extrusion unit is tilted to its vertical position its lower end rests on the collar 12 for transfer to the kiln (not shown) for treatment while remaining in its vertical position.

Having fully described my invention, it is to be understood that I am not to be limited to the details herein set forth, but that my invention is of the full scope of the appended claims.

I claim:

1. Apparatus for forming clay products for kiln treatment, comprising: an intermittently operable die for forming a tubular extrusion of clay material, and including means operatively associated with said die for scoring the tubular extrusion longitudinally along peripherally spaced lines; a core conforming to the internal configuration of the tubular extrusion positioned to receive and support the tubular extrusion from said die; a plurality of scoring blades disposed around the core for essentially radial movement into the tubular extrusion to produce peripheral scores in the surrounding tubular extrusion between the longitudinal scores thereby dividing the tubular extrusion into a plurality of clay products for separation after kiln treatment; means downstream of said scoring blades for severing a preselected length of the tubular extrusion; and a series of platens disposed under the core to support the underlying portion of the tubular extrusion, the platens being separated to clear scoring blades underlying the core.

2. An apparatus, as defined in claim 1, wherein: the die is polygonal in cross section forming peripherally spaced apices along the tubular extrusion; and the longitudinal scoring means are located at said apices.

3. An apparatus, as defined in claim 1, wherein: the scoring blades include spaced scoring projections engagable with the core to form spaced perforations in the tubular extrusion, and recesses therebetween to form intermittent severable connections between the clay articles.

4. An apparatus, as defined in claim 1, wherein: sets of hole punching dies are carried by the scoring blades for piercing the clay products adjacent to said blades to form fastener receiving perforations.

5. An apparatus, as defined in claim 1, wherein: the die is polygonal in cross section forming peripherally spaced apices extending longitudinally with respect to the tubular extrusion; the longitudinal scoring means being located at said apices; the sides of the die, core and tubular extension being S-shaped in section between the longitudinal scores; and the extremities of the scoring blades are likewise S-shaped in conformity with the sides of the core.

6. Apparatus for forming clay products for kiln treatment, comprising: a die for forming a tubular extrusion of clay material, and including means connected to said die for scoring the tubular extrusion longitudinally along peripherally spaced lines; a horizontally extending core conforming to the internal configuration of the tubular extrusion positioned to receive and support the tubular extrusion from said die; a plurality of scoring blades disposed around the core for essentially radial movement into peripheral confrontation with the core to produce peripheral scores in the surrounding tubular extrusion between the longitudinal scores thereby dividing the tubular extrusion into a plurality of clay products for separation after kiln treatment; and means for severing a preselected length of the tubular extrusion, said severing means being spaced axially downstream from the scoring blades and positioned to sever said extrusion at a location adjacent to but spaced from one of said peripheral scores to form an end portion on the severed tubular extrusion adapted to serve as kiln furniture during kiln treatment, and a series of platens disposed under the core to support the underlying portions of the tubular extrusions, the platens being axially separated to clear scoring blades underlying the core.

* * * * *